UNITED STATES PATENT OFFICE.

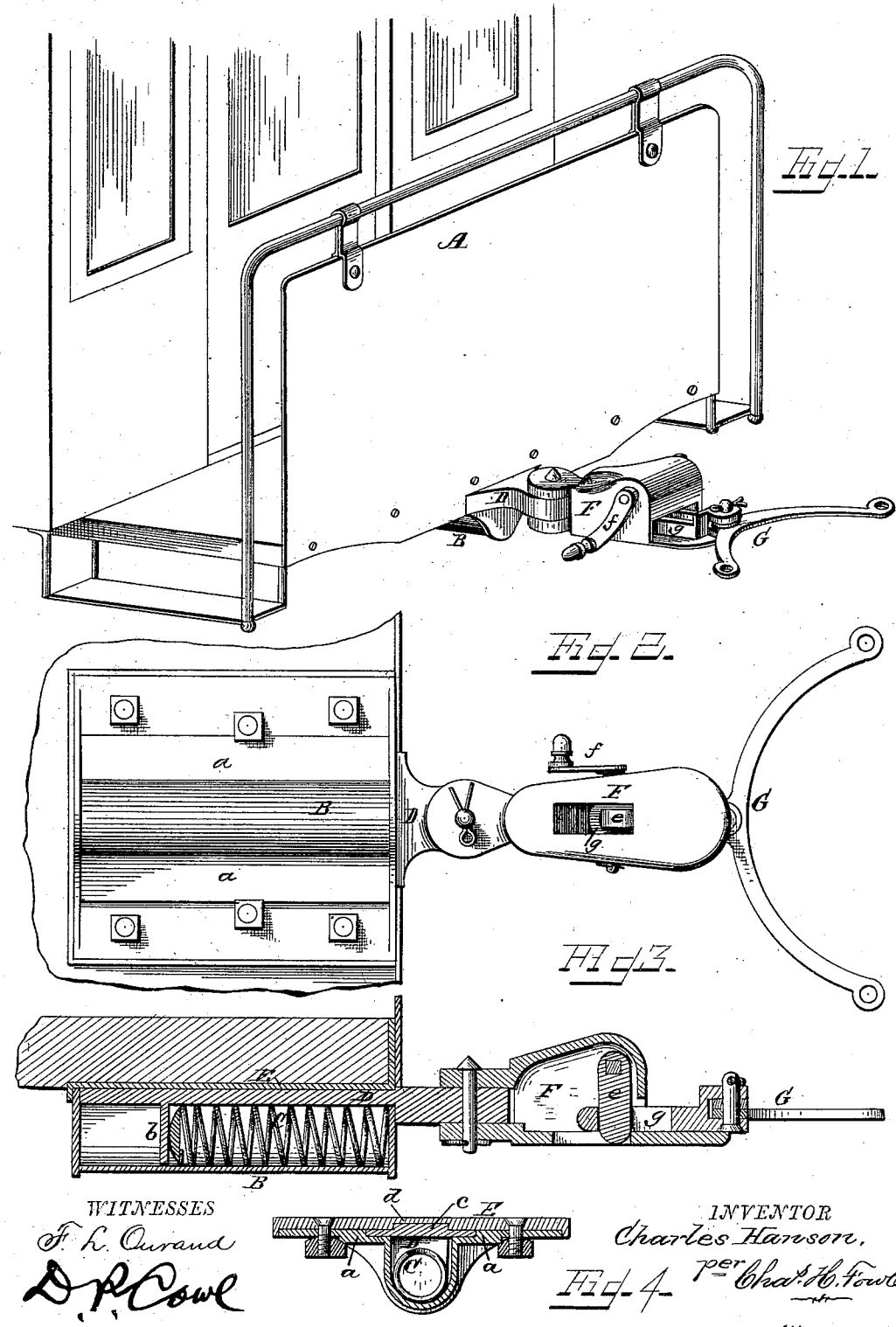

CHARLES HANSON, OF ROCK ISLAND, ILLINOIS, ASSIGNOR OF ONE-HALF TO FREDERICK APPLEQUIST, OF SAME PLACE.

STREET-CAR COUPLING.

SPECIFICATION forming part of Letters Patent No. 299,781, dated June 3, 1884.

Application filed March 31, 1884. (No model.)

*To all whom it may concern:*

Be it known that I, CHARLES HANSON, a citizen of the United States, residing at Rock Island, in the county of Rock Island and State of Illinois, have invented certain new and useful Improvements in Street-Car Couplings; and I do hereby declare that the following is a full, clear, and exact description of the same, reference being had to the annexed drawings, making a part of this specification, and to the letters and figures of reference marked thereon.

Figure 1 of the drawings is a perspective view of one end of a horse-car with my improved coupling attached; Fig. 2, a bottom plan view of the coupling; Fig. 3, a longitudinal section, and Fig. 4 a cross-section taken through the casing containing the spring.

The present invention has relation to that class of devices adapted for attachment to horse-cars for coupling thereto the single or double tree; and it consists in certain details of construction, substantially as shown in the drawings, and hereinafter described and claimed.

In the accompanying drawings, A represents the forward end of a street or horse car, to the under side of which is connected by bolts and nuts a suitable casing, B, for inclosing and protecting a spiral spring, C. The casing B has laterally-extending shouldered plates $a$, to form a support and guide for a tongue, D, which is cast with a bearing, $b$, for the end of the spring C, and at its top has a flange, $c$, to fit and work in a correspondingly-formed groove $d$ in a cap-plate, E. To the tongue D is pivoted the draw-head F, provided with a coupling-pin, $e$, operated by crank-handle $f$, for connecting to the draw-head the coupling-link $g$, to which the single-tree G is pivoted. The draw-head F is cast with a hood, H, at its front end, so as to cover it and prevent any dirt or sleet from interfering with the working of the coupling-pin. The draw-head is also cast with a platform, I, which forms a guide for the link $g$, thus enabling a coupling to be effected in the night without a light. The platform I also serves as a support for the single or double tree, preventing it from hanging loose on the horse's heels, and pivoting the single or double tree to the coupling-link, and also the draw-head F to the tongue, enables the draw-head or the single or double tree to swing to either the right or left when a scared or frightened horse should jump to either side, thus moderating jerks before the driver picks up his reins. The spring C, in connection with the tongue D, prevents sudden jerks and secures light draft for the horses either at starting or on the run.

Having now fully described my invention, what I claim as new, and desire to secure by Letters Patent, is—

1. In a street-car coupling, a single or double tree pivoted to a coupling-link, in combination with a pivoted draw-head cast with a protecting-hood and a platform at its front, and provided with a coupling-pin, substantially as and for the purpose set forth.

2. In a street-car coupling, a suitable casing containing a spring, and provided at its sides with shouldered plates and a grooved cap-plate, the whole connected to the under side of the car, in combination with a tongue having a flange working in the groove of the cap-plate and a bearing for the end of the spring, and having pivoted at its front end a draw-head with coupling-pin, substantially as and for the purpose specified.

In testimony that I claim the above I have hereunto subscribed my name in the presence of two witnesses.

CHARLES HANSON.

Witnesses:
J. C. SWILER,
P. O'MARA.